(12) United States Patent
Isom et al.

(10) Patent No.: US 11,001,466 B2
(45) Date of Patent: May 11, 2021

(54) TRACKABLE, PACKETIZED DISTRUBUTION SYSTEM

(71) Applicant: Counted, LLC, Salt Lake City, UT (US)

(72) Inventors: Michael Isom, West Valley, UT (US); Duane Michael Scott Johnson, Cottonwood Heights, UT (US)

(73) Assignee: Counted, LLC, Salt Lake City, UT (US)

( * ) Notice: Subject to any disclaimer, the term of this patent is extended or adjusted under 35 U.S.C. 154(b) by 0 days.

(21) Appl. No.: 16/178,560

(22) Filed: Nov. 1, 2018

(65) Prior Publication Data
US 2019/0127169 A1 May 2, 2019

Related U.S. Application Data

(60) Provisional application No. 62/627,528, filed on Feb. 7, 2018, provisional application No. 62/580,566, filed on Nov. 2, 2017.

(51) Int. Cl.
*B65H 16/00* (2006.01)
*G01N 27/04* (2006.01)
(Continued)

(52) U.S. Cl.
CPC .......... *B65H 16/005* (2013.01); *B65H 18/28* (2013.01); *G01N 27/041* (2013.01); *G01N 27/228* (2013.01); *B65H 2220/03* (2013.01); *B65H 2401/211* (2013.01); *B65H 2701/1942* (2013.01); *G01N 27/22* (2013.01)

(58) Field of Classification Search
CPC .. B65H 16/005; B65H 18/28; B65H 2200/03; B65H 2701/1942; G01N 27/041; G01N 27/228; G01N 27/22; A61J 1/03; A61J 1/035
See application file for complete search history.

(56) References Cited

U.S. PATENT DOCUMENTS 6,140,146 A 10/2000 Brady et al.
6,220,516 B1 4/2001 Tuttle et al.
(Continued)

FOREIGN PATENT DOCUMENTS

WO WO2004000200 12/2003

*Primary Examiner* — Son T Le
*Assistant Examiner* — Dustin R Dickinson
(74) *Attorney, Agent, or Firm* — FisherBroyles, LLP

(57) ABSTRACT

Embodiments are directed to systems and apparatuses for tracking usage of a packetized item. In one scenario, an apparatus may be provided for tracking use of a packetized item. The apparatus may include a roll of packets where each packet is designed to contain packetized items such as pills. The packets may have an electrically conductive material applied to various parts thereof. The apparatus may also include an enclosure configured to track usage of the packets. The enclosure may include a power source, a display, a transceiver, and a microcontroller that is configured to control operation of the display and may also analyze signals from the electrically conductive material to determine the distribution status of the packets. In one example, as packets are removed from the roll of packets, the microcontroller can determine when, where and how many packets were removed from the roll.

20 Claims, 7 Drawing Sheets

(51) Int. Cl.
*G01N 27/22* (2006.01)
*B65H 18/28* (2006.01)

(56) References Cited

U.S. PATENT DOCUMENTS

| | | | |
|---|---|---|---|
| 6,478,229 B1 | 11/2002 | Epstein | |
| 6,483,473 B1 | 11/2002 | King et al. | |
| 6,794,000 B2 | 9/2004 | Adams et al. | |
| 7,183,920 B2 | 2/2007 | Napolitano | |
| 7,319,397 B2 | 1/2008 | Chung et al. | |
| 7,477,150 B2 | 1/2009 | Renzetti et al. | |
| 7,535,358 B2 | 5/2009 | Crider et al. | |
| 7,564,354 B2 | 7/2009 | Eren et al. | |
| 7,712,674 B1 | 5/2010 | Warner et al. | |
| 7,744,004 B2 | 6/2010 | Kato et al. | |
| 7,812,726 B2 | 10/2010 | Barlow, Jr. et al. | |
| 8,079,247 B2 | 12/2011 | Russell et al. | |
| 8,692,674 B2 | 4/2014 | Hioki et al. | |
| 8,698,627 B2 | 4/2014 | Londo et al. | |
| 9,058,733 B2 | 6/2015 | Brinkley et al. | |
| 9,773,743 B2 | 9/2017 | Maijala | |
| 9,856,049 B2 | 1/2018 | Seymour | |
| 9,877,296 B2 | 1/2018 | Kelly | |
| 2006/0109130 A1 | 5/2006 | Hattick et al. | |
| 2006/0180647 A1 | 8/2006 | Hansen | |
| 2006/0198080 A1 | 9/2006 | Hawes et al. | |
| 2007/0069895 A1 | 3/2007 | Koh | |
| 2007/0096918 A1 | 5/2007 | Badillo et al. | |
| 2007/0109103 A1 | 5/2007 | Jedrey et al. | |
| 2007/0185613 A1 | 8/2007 | Feldenzer | |
| 2008/0245922 A1 | 10/2008 | Fellhoelter | |
| 2009/0189763 A1 | 7/2009 | Brinkley et al. | |
| 2010/0156606 A1 | 6/2010 | Gold | |
| 2010/0324403 A1 | 12/2010 | Brister | |
| 2011/0285507 A1 | 11/2011 | Nelson | |
| 2013/0000423 A1 | 1/2013 | Kim | |
| 2013/0285681 A1 | 10/2013 | Wilson et al. | |
| 2014/0262919 A1* | 9/2014 | Hussain | B65D 75/327 206/534 |
| 2015/0001125 A1* | 1/2015 | Peris Y Saborit | A61J 1/035 206/534 |
| 2015/0249059 A1* | 9/2015 | Maijala | A61J 1/035 257/664 |

* cited by examiner

TRACKABLE, PACKETIZED DISTRUBUTION SYSTEM

CROSS-REFERENCE TO RELATED APPLICATIONS

This application claims priority to and the benefit of U.S. Provisional Patent Application Ser. No. 62/580,566, filed on Nov. 2, 2017, entitled "Trackable, Packetized Distribution System," as well as U.S. Provisional Patent Application Ser. No. 62/627,528, filed on Feb. 7, 2018, entitled "Trackable, Packetized Distribution System," both of which applications are incorporated by reference herein in their entirety.

BACKGROUND

In today's marketplace, items for sale are often distributed in disposable packages. Food items such as cereal, toys including action figures and dolls, or even small kitchen appliances may each be packaged in disposable packaging. Other items such as pills may also be packaged in disposable packaging. In some cases, the pills may be packaged together in a pouch or sleeve. These pouches may include a collection of different pills, for example, where each pouch is to be consumed at a certain time of day. Other items may be distributed using a similar method of packaging.

Manufacturers of these packages typically produce these packages and ship them to their various destinations. The manufacturers typically have no way of knowing when or if their packages were used. They simply produce the packages and send them to the user or to a reseller, not having any way of knowing whether the packages were ever opened.

BRIEF SUMMARY

Embodiments are directed to systems and apparatuses for tracking usage of a packetized item. In one scenario, an apparatus may be provided for tracking use of a packetized item. The apparatus may include a roll of packets where each packet is designed to contain packetized items such as pills. The packets may have an electrically conductive material applied to various parts thereof. The apparatus may also include an enclosure configured to track usage of the packets. The enclosure may include a power source, a display, a transceiver, and a microcontroller that is configured to control operation of the display and may also analyze signals from the electrically conductive material to determine the distribution status of the packets. In one example, as packets are removed from the roll of packets, the microcontroller can determine when, where and how many packets were removed from the roll.

In another embodiment, a system is provided for tracking usage of an item. The system may include one or more packets, where each packet is configured to contain packetized items. The system may also include an electrically conductive layer that is applied to at least a portion of each packet. The electrically conductive layer may include at least some portion of electrically conductive material. The system may also include a processor and various sensors that are electrically connected to the electrically conductive material in the electrically conductive layer. The processor may be configured to monitor the electrically conductive layer for incremental changes in electrical properties using the sensors.

In another embodiment, a method is provided for manufacturing an apparatus for tracking usage of an item. The method includes providing a roll of one or more packets, where each packet is configured to hold multiple items. The method next includes applying an electrically conductive layer to at least a portion of the packet. The electrically conductive layer includes at least some electrically conductive material. The method further includes affixing a processor to the apparatus and affixing sensors to the packets. The sensors may be electrically connected to the electrically conductive material in the electrically conductive layer. The processor may be configured to monitor the electrically conductive layer for incremental changes in various electrical properties using measurements received from the sensors.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be apparent to one of ordinary skill in the art from the description or may be learned by the practice of the teachings herein. Features and advantages of embodiments described herein may be realized and obtained by means of the instruments and combinations particularly pointed out in the appended claims. Features of the embodiments described herein will become more fully apparent from the following description and appended claims.

BRIEF DESCRIPTION OF THE DRAWINGS

To further clarify the above and other features of the embodiments described herein, a more particular description will be rendered by reference to the appended drawings. It is appreciated that these drawings depict only examples of the embodiments described herein and are therefore not to be considered limiting of its scope. The embodiments will be described and explained with additional specificity and detail through the use of the accompanying drawings in which.

DETAILED DESCRIPTION

Figure 1:
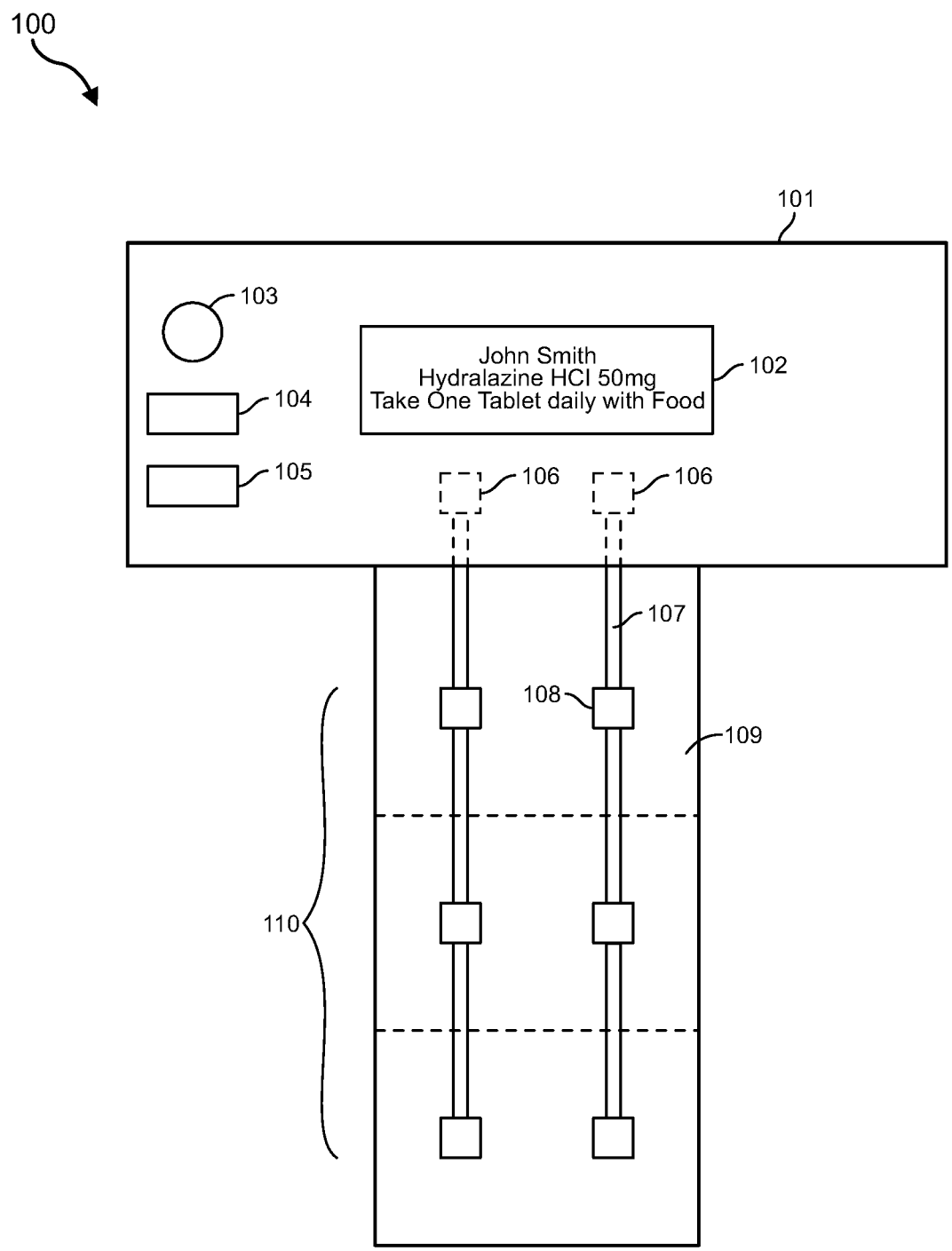
FIG. 1 illustrates an embodiment of an apparatus for tracking usage of packetized item.

As noted above, the embodiments described herein are directed to systems and apparatuses for tracking usage of a packetized item. In one embodiment, an apparatus may be provided for tracking use of a packetized item. The apparatus may include a roll of packets where each packet is designed to contain packetized items such as pills. The packets may have an electrically conductive material applied to various parts thereof. The apparatus may also include an enclosure configured to track usage of the packets. The enclosure may include a power source, a display, a transceiver, and a microcontroller that is configured to control operation of the display and may also analyze signals from the electrically conductive material to determine the distribution status of the packets. In one example, as packets are removed from the roll of packets, the microcontroller can determine when, where and how many packets were removed from the roll.

In another embodiment, a system is provided for tracking usage of an item. The system may include one or more packets, where each packet is configured to contain packetized items. The system may also include an electrically conductive layer that is applied to at least a portion of each packet. The electrically conductive layer may include at least some portion of electrically conductive material. The system may also include a processor and various sensors that are electrically connected to the electrically conductive material in the electrically conductive layer. The processor may be configured to monitor the electrically conductive layer for incremental changes in electrical properties using the sensors.

In another embodiment, a method is provided for manufacturing an apparatus for tracking usage of an item. The method includes providing a roll of one or more packets, where each packet is configured to hold multiple items. The method next includes applying an electrically conductive layer to at least a portion of the packet. The electrically conductive layer includes at least some electrically conductive material. The method further includes affixing a processor to the apparatus and affixing sensors to the packets. The sensors may be electrically connected to the electrically conductive material in the electrically conductive layer. The processor may be configured to monitor the electrically conductive layer for incremental changes in various electrical properties using measurements received from the sensors.

Embodiments described herein may implement microcontrollers, embedded processors or other types of systems generally referred to as computing systems. These computing systems are now increasingly taking a wide variety of forms. As used herein, the term "computing system" includes any device, system, or combination thereof that includes at least one processor, and a physical and tangible computer-readable memory capable of having thereon computer-executable instructions that are executable by the processor. A computing system may be configured with various radios or other transceivers capable of communicating to other computing systems. For example, a transceiver may communicate to a mobile computing device (e.g. a phone or tablet), to a stationary device such as a PC, or to a cloud computing environment.

The devices and systems described herein may include multiple different communication channels that allow the devices and systems to communicate with other message processors over a wired or wireless network. Such communication channels may include hardware-based receivers, transceivers or transceivers, which are configured to receive data, transmit data or perform both. Embodiments described herein also include physical computer-readable media for carrying or storing computer-executable instructions and/or data structures. Such computer-readable media can be any available physical media that can be accessed by a general-purpose or special-purpose computing system. This may include flash memory, hard drives, processor cache memory, random access memory or similar.

Still further, system architectures described herein can include a plurality of independent components that each contribute to the functionality of the system as a whole. This modularity allows for increased flexibility when approaching issues of platform scalability and, to this end, provides a variety of advantages. System complexity and growth can be managed more easily through the use of smaller-scale parts with limited functional scope. Platform fault tolerance is enhanced through the use of these loosely coupled modules. Individual components can be grown incrementally as business needs dictate. Modular development also translates to decreased time to market for new functionality. New functionality can be added or subtracted without impacting the core system.

FIG. 1 illustrates an embodiment of an apparatus for tracking usage of a product. The apparatus 100 may include an enclosure 101 that is electrically connected to one or more packets 110. Each individual packet 109 may be connected to one or more other packets or may be separate. The packets may include substantially any type of item, from pills or medicines to toys to food to computer hardware components such as random access memory (RAM). Indeed, any manufacturer or reseller that wanted to track the usage or distribution of packetized items may use the embodiments herein to perform such tracking.

Each packet may be made of plastic, cloth or some other material. Each packet may have an electrically conductive material 107 applied thereon. In some cases, this material may be electrically conductive ink. The electrically conductive ink 107 may be applied during manufacture of the packets or may be applied after the packets have been filled with their packetized items. The packets may be substantially any size or shape. In the embodiment shown in FIG. 1, the packets 110 are rectangular in shape, and include electrically conductive ink 107 in strips on each side of the packet. The electrically conductive ink 107 may have resistors 108, sensors (shown in FIG. 3) or other electrical components applied thereon or embedded therein in order to reduce, store and/or transfer electrical current.

For example, the enclosure 101 may have leads 106 that are connected to the electrically conductive ink 107. The enclosure 101 may include a microcontroller 104 that may be configured to determine a total amount of resistance in each line of electrically conductive ink 107. After the amount of resistance is determined in one or more of the traces, if an individual packet 109 is removed from the collection of packets 110 (e.g., a roll of packets), the total amount of resistance in the lines of electrically conductive ink 107 will change. The microcontroller 104 may make a note of when and where the change occurred, as well as recording how many packets were removed. Indeed, the microcontroller 104 may note the change in resistance (or other electrical property) when a single packet is removed from the collection of packets 110. This amount may be multiplied (or divided) to determine how many packets were removed at a given time.

In some embodiments, the display 102 of the enclosure 101 may be a touchscreen display that is configured to display information as well as receive user inputs. In some cases, the display may request an input such as a user ID, password, fingerprint or other identifier indicating who is separating the packet 109 from the roll of packets 110. In such cases, the microcontroller may store information indicating who separated the packet(s) from the roll, in addition to the time and location. In this manner, a manufacturer or distributor may be able to track when packets are removed for use, where the roll of packets was when the packets were removed, and potentially who the person was that removed the packets.

In some embodiments, a power source 103 may provide power to the electrically conductive material 107. For example, the enclosure 101 may have a battery or other power source 103, either wired or wireless. The power may flow from the power source 103 down the electrically conductive material 107 and through each resistor 108 to the end of the packets 110. In such cases, the microcontroller 104 may be configured to determine an initial measure of an electrical property (e.g., current flowing through the conductive material), and may then determine when the electrical property (current in this example) changes as packets are separated. Each packet may include electrical components that allow current to flow through to other packets down the line. Each packet's components may add additional resistance. Thus, the current flow with an increased number of resistors would be less than it would be with fewer resistors. Accordingly, a current flow may measure stronger when fewer packets are present in the roll and may measure weaker when more packets are present in the roll. Other, perhaps similar, changes may occur with measurements of resistance, capacitance, voltage, permittivity, electrical field strength, or other electrical properties as packets are removed from the roll.

Figure 2:
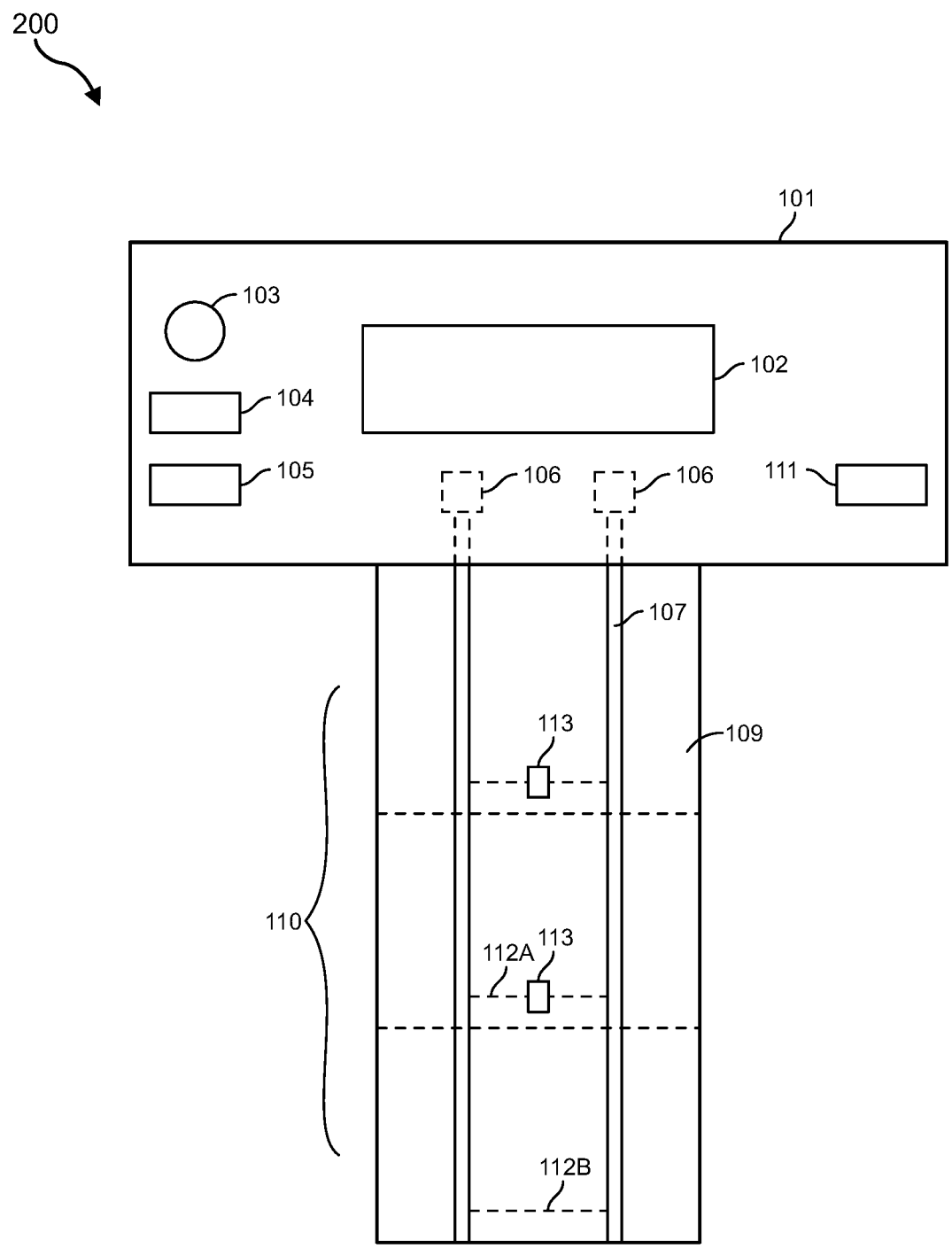
FIG. 2 illustrates an alternative embodiment of an apparatus for tracking usage of packetized item.

In some embodiments, physical barriers may be provided on each packet that prevent electricity from flowing between right side and left side traces. This ensures that the electricity flows down to the last packet (i.e., the "bottom packet" or "end packet"). As shown in FIG. 2, each packet 109 may also be equipped with a pull or tear-off that removes the physical barrier 113 when the packet is removed. The tear-off may thus reach up from a bottom packet into a top packet and may be attached to the top packet's physical barrier 113. When the bottom packet is removed, the tear-off may grab the physical barrier of the top packet and may remove the physical barrier.

As such, because the physical barrier is now removed, a new circuit is formed between the right and left traces of the new end packet via the conductive link 112A/112B. This ensures that the current can travel in a loop even when packets are removed. It also ensures that each time a packet is removed, a new circuit is formed across the traces of the new end packet via the link 112A/112B. Thus, whether electrical current is transferred through the traces, or whether the traces are measured for resistance, or whether some other electrical property is measured, the end packet will form a complete loop, allowing for accurate measurements and avoiding an open circuit. The microcontroller 104 can then determine a change in electrical properties and can log the change and/or notify users of the change.

In one embodiment, the apparatus 100 may be designed to distribute pills. For example, if a user needs to take a certain selection of pills in the morning, or in the evening, the user may have a designated "morning" pill packet and an "evening" pill packet. The user may have a roll of such packets, representing, for example, a week's worth of pills. The user or a manufacturer or caregiver may apply the enclosure 101 to the beginning of the roll and as the user systematically removes packets from the roll, the microcontroller 104 may store indications of when, where and potentially who removed the packet(s) from the roll.

The transceiver 105 in the enclosure 101 may be configured to communicate with one or more outside systems to determine the current location of the enclosure. The transceiver 105 may include a global positioning system (GPS) radio, a WiFi radio, a Bluetooth radio, a cellular radio or other type of radio capable of communicating with other computing systems or networks. From these communications, the microprocessor 104 may receive GPS coordinates, triangulate its position, or otherwise determine its location using one or more of the computer networks. Thus, in this manner, each time a packet is removed from the roll, the microprocessor can store an indication of when, where and, in some cases, who removed the packet.

The apparatus 100 may include a display 102 that may be a touchscreen or other interactive display. In some cases, the enclosure has buttons, sliders or other input mechanisms to allow user interaction with the display. The display may show the intended user's name, information about the pills, or other information related to the contents of the packets. If the packets contained food, for example, the display may show a recipe for the food or other preparation instructions. If the packet contained cell phone accessories or other items, the display may show an associated website or app or other related information. If the packet contained a computer hardware component, the display 102 may show a video indicating how the component is to be installed. The user may be able to touch the display 102 to select certain options, or answer questions such as "Did you take your AM pills?" or similar questions. In some embodiments, the enclosure may include a fingerprint reader or other biometric data reader to validate the identity of the user. In some cases, the enclosure may include clamps, clasps or locks that prevent a packet from being torn away until a proper identity verification has been performed.

The enclosure may be designed to use cheap computing hardware components, allowing the enclosure to be disposable. In other cases, the enclosure may be more robust, and may be reusable with many different rolls or groups of packets. In some embodiments, the microprocessor 104 may be configured to report usage of the packets to a publicly available block chain. This block chain may be established and/or used to monitor the location and consumption of each roll of packets. Indeed, at least in some cases, each roll of packets may have its own unique identifier. As each packet is removed from the roll, the usage of that packet may be reported to a public or private block chain. Using this block chain, a concerned person such as a parent, a caregiver, a doctor or nurse may be able to see that the packet was removed from the roll and may see the location of the roll, the time the packet was removed, and/or who removed the packet from the roll.

Each packet may have an electrically conductive material such as electrically conductive ink 107 applied to various parts of the packets. In the embodiment shown in FIG. 1, electrically conductive ink 107 may be applied as traces leading to resistors. In other cases, the electrically conductive ink 107 may be applied in different shapes or patterns or may be applied in a single wide layer that covers all or a portion of the packet 109. The microcontroller 104 may send and detect signals along the electrically conductive material. The microcontroller may thus be able to detect changes in electrical properties, and therefore determine that a packet (or multiple packets) have been removed. In some cases, a minimum threshold change is to be registered at the microcontroller 104 before any determinations are made. Thus, if a packet is slightly removed from the roll, but fully removed, the microcontroller 104 will not register usage or removal of a packet.

In one embodiment, electrically conductive ink 107 may be printed on a roll of packets 110 in the form of traces on the packets. The traces may be electrically connected to resistors 108 distributed on the packets. The enclosure 101 may have electrical contacts 106 that contact at least a portion of the electrically conductive ink 107. The microcontroller may analyze signals or electrical properties of the system, and changes therein. In some cases, the electrical properties analyzed by the microcontroller 104 are measurements of resistance detected at the electrical contacts 106. In this embodiment, the packets 109 are assembled as a roll or group of packets 110 connected together in a separable manner (e.g. along the dotted lines in FIG. 1). The measurements of resistance may decrease as each packet is separated from the group of packets 110.

Another embodiment is shown in FIG. 2. In FIG. 2, system 200 is provided for tracking usage of a packetized item. A packetized item may include any type of object stored in a container or packet. For example, a packet may include medical items such as pills, syringes, instruments, or surgical tools. In alternative examples, a packet may include food such as candy or nuts or other items. Indeed, substantially any type of item may be stored in the packets or containers described herein. Usage of these items may be tracked with the system 200.

The system 200 may include packets 110 designed to contain items (not shown). An electrically conductive layer 107 may be applied to at least a portion of each packet. In the embodiment of FIG. 2, the electrically conductive layer 107 may be applied in strips that run the length of the packets 110. In other embodiments, the electrically conductive layer 107 may be applied as a thin film to all or different portions of the packets. In some cases, the electrically conductive layer 107 comprises electrically conductive ink or some other electrically conductive material (e.g. aluminum or copper).

Figure 3:
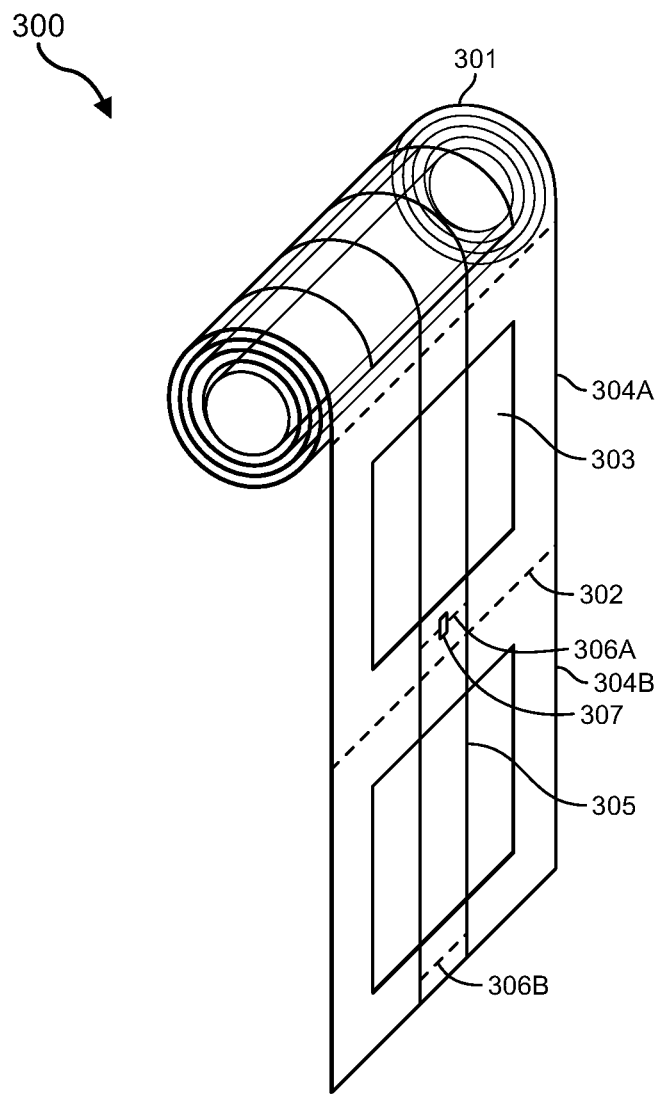
FIG. 3 illustrates an embodiment of a roll of packets where each packet can be individually removed from the roll.

As shown in FIG. 3, an embodiment 300 is presented. The embodiment 300 includes a roll of packets 301. The roll may include substantially any number of packets in any shape or size. In some cases, all of the packets in a roll are the same size, and in other cases, at least some of the packets may differ in size. Each packet (e.g., 304A/304B) may have conductive material (e.g., traces 305) applied thereto. Each packet may include a containing portion 303 in which the packetized items are stored. The roll of packets 301 may be unwound to access additional packets.

As noted above, at least in some embodiments, each packet may have a link between the traces 305, and each link may have a physical barrier 307. In the bottom packet 304B, it should be noted, the physical barrier has already been removed (with the removal of the previous packet), and the link 306B now physically connects the traces. In the upper packet 304A, the physical barrier 307 is still in place and, as such, the traces in packet 304A are not electrically connected. Once packet 304B is removed however (e.g., separated along the perforated portion 302), the physical barrier 307 will be removed and the traces in packet 304A will be linked via link 306A. Accordingly, in this manner, packets may be separated while ensuring that the microcontroller is still able to track the remaining packets in the roll 301.

Figure 4:
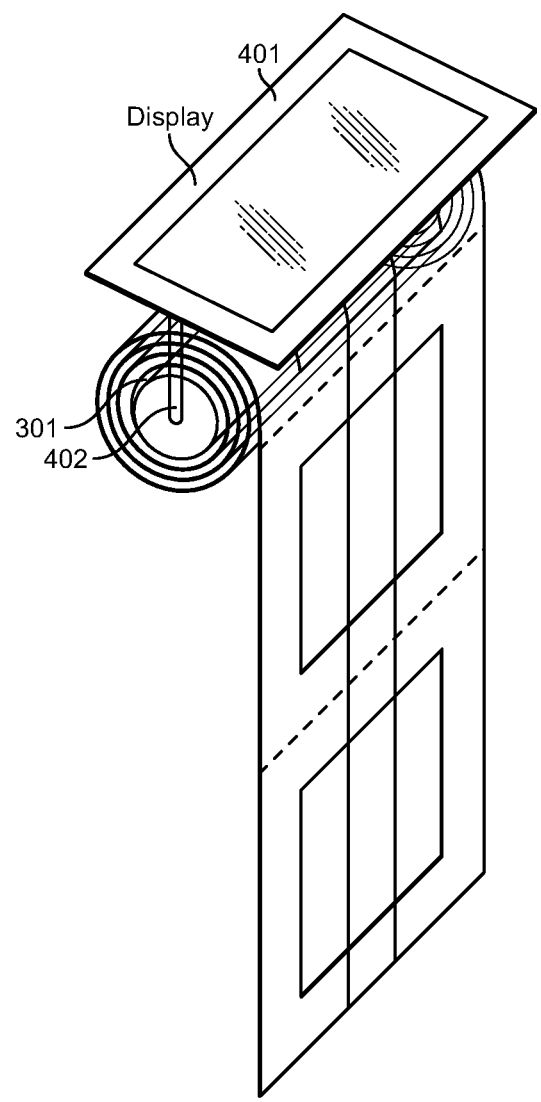
FIG. 4 illustrates an embodiment of a roll of packets where the roll includes a display device.

In some cases, as described in relation to FIG. 2, the roll of packets 301 may have a display. In some embodiments, as shown in FIG. 4, the roll of packets 301 may have a display 401 attached thereto. The display may be attached to the ends of the roll 301, allowing the roll to continue rolling to allow access to the remaining packets. The display may be electrically connected to the traces 107 via wires or other connectors that extend down the arms 402. In some cases, the display 401 may include some or all of the hardware components used in the enclosure 101 including a battery 103, microcontroller 104, transceiver 105 or a data store 111. In some embodiments, these components may be embedded in the roll 301, and thus would not be included with the display 401. Thus, many different hardware component combinations are possible, either in the enclosure 101, in the display 401, or embedded in the roll itself.

Returning to FIG. 2, the system 200 may also include a processor 104, and one or more capacitance sensors that are electrically connected to the electrically conductive material in the electrically conductive layer 107. The capacitance sensors may be designed to detect an amount of charge stored in the electrically conductive layer. Indeed, in some embodiments, the electrically conductive layer 107 may be applied such that two portions of the electrically conductive layer are separated by a dielectric, thereby forming a capacitor.

Figure 5:
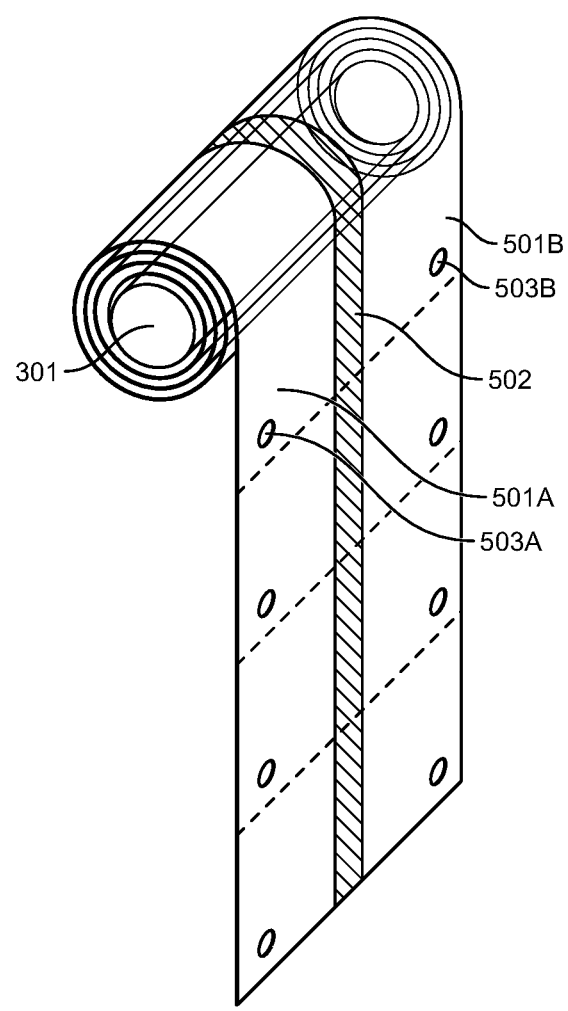
FIG. 5 illustrates an alternative embodiment of a roll of packets where each packet can be individually removed from the roll.

FIG. 5 illustrates an embodiment that includes two conductive layers separated by a dielectric layer. For instance, the roll of packets 301 may include a first conductive layer 501A and a second conductive layer 501B. These two conductive layers may be separated by a dielectric layer 502. As noted in regard to FIGS. 3 & 4, the roll of packets 301 may include electrical components including a microprocessor, a battery and/or a transceiver. The microprocessor may send an electrical signal down through at least one of the conductive layers 501A/501B. The dielectric may receive and store at least some of this charge. This charge may be small (e.g., approximately 5-50 milifarads). If the electrically conductive layer 107 is unbroken, more capacitance may be sensed by one or more of the sensors 503A/503B. If the electrically conductive layer is broken, less capacitance may be sensed at the capacitance sensors 503A/503B. Accordingly, the smaller the amount of conductive material connected to the sensors 106, the less capacitance will be sensed and, conversely, the more conductive material connected to the sensors, the more capacitance will be sensed.

In one embodiment, an initial capacitance measurement may be taken and the sensors may be calibrated to zero. Then, at later times, subsequent periodic measurements may be taken by the microprocessor. If a substantial change has occurred (e.g. a change from 25 milifarads to 10 milifarads), then the microprocessor may determine that at least one of the electrically conductive layers 501A/501B has been torn or severed, and that the packet the electrically conductive layer was applied to has likely been opened or separated from the other packets.

The location of the tear may affect how much energy is stored in the electrically conductive layer 107. If the tear is further away from the sensors, a smaller change in capacitance may occur, while on the other hand, if the tear is very close to the capacitance sensors 503A/503B, a relatively larger change in capacitance may occur. Specifically, if the tear is further away, the total measured capacitance may drop slightly, and if the tear is very close to the sensors, the total measured capacitance may drop significantly. The processor 104 may be configured to monitor the electrically conductive layers 501A/501B for incremental changes in capacitance using the capacitance sensors 503A/503B. Such monitoring may occur at periodic intervals. When not monitoring or transferring data, the processor may be powered off to conserve energy.

Figure 6:
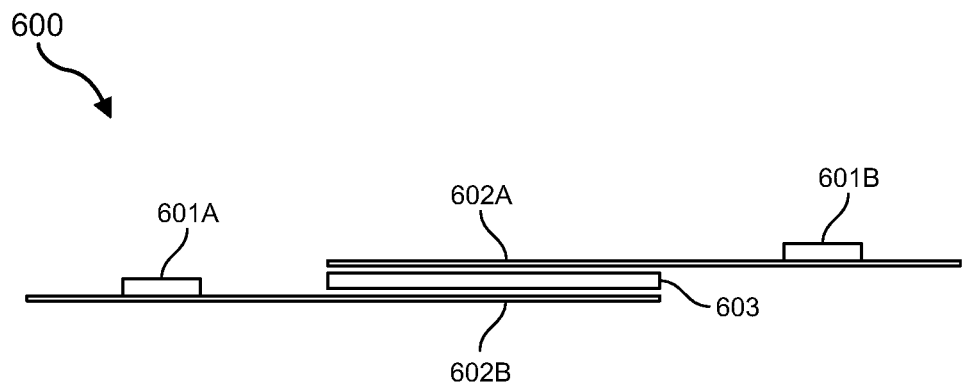
FIG. 6 illustrates an embodiment in which a dielectric layer is positioned between two conductive layers.

As shown in FIG. 6, a trackable packet 600 may include one or more connections to various capacitance sensors (e.g., 601A/601B). The capacitance sensors 601A/601B may be connected to two different sheets of conductive foil 602A and 602B. The sheets of conductive foil 602A and 602B may be separated by a dielectric 603. The dielectric 603, as noted above, may be made of ceramic, glass, paper, plastic or any other material that is capable of acting as a dielectric. The conductive foil sheets may be made of aluminum, copper, or other conductive elements. The two conductive foils and the dielectric may function as a capacitor that stores a certain amount of charge. In some cases, the charge may be relatively small, e.g., on the level of 5-50 microfarads. In other cases, the charge may be larger, e.g., on the level of 5-50 millifarads. It will be recognized here that substantially any level of charge may be detected, whether it be millifarads, microfarads, nanofarads, picofarads or other levels of stored charge.

While capacitance sensors 601 are shown in FIG. 6, it will be understood that other typed of sensors may also be used, in addition to or as an alternative to the capacitance sensors 601. For example, the sensors may be resistance sensors. The resistance sensors may measure a resistance across the dielectric, from one conductive foil layer to the other. This measure of resistance may change as the packet 600 is torn apart. Voltage, current, permittivity, inductance or other electrical properties may be measured in a similar manner. In some embodiments, a hall effect sensor may be used to detect changes in current between two points. In other cases, additional hardware components including magnets may be used to detect when a packet has been ripped or torn.

For example, magnets may be placed at different positions within the two conductive foil layers. A current may be run between the magnets and a given measurement of a magnetic field may be stored by the microcontroller 104. Subsequent changes in the magnetic field may be stored and, if sufficiently large, may indicate that the packet 600 has been torn. Accordingly, many different techniques may be used alone or in combination with each other to provide an accurate indication of when and where a package or other item was opened.

Figure 7:
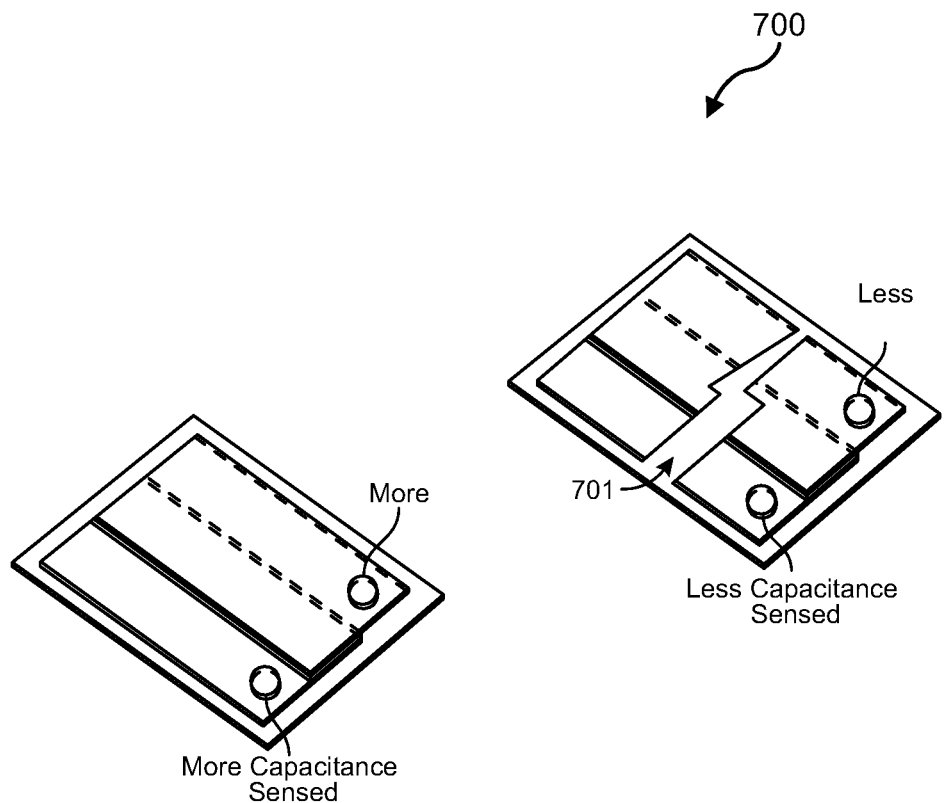
FIG. 7 illustrates an embodiment in which more or less capacitance is sensed based on tears in the packet.

FIG. 7 illustrates a top perspective view of a tracking packet 700. As noted above with regard to FIG. 6, the capacitance sensors 601A/601B may be connected to opposite sheets of conductive foil, 602A and 602B, separated by the dielectric layer 603. If the tracking packet 700 is unbroken, a greater amount of capacitance may be sensed (as shown in FIG. 7). If the tracking packet 700 is broken (e.g., at 701), a lesser amount of capacitance will be sensed at the sensors 601A/601B. Because less dielectric material is connected to the sensors, less capacitance will be sensed. When the dielectric is whole, more material is available to store a charge and, as such, more capacitance will be sensed. Similar principles may apply to detecting changes in voltage, current, resistance or other electrical properties.

In some embodiments, the tracking packet 700 may include some form of non-conductive shielding around the capacitive layer to prevent false positives. For instance, rubber or an electrically insulating polymer material may be used to coat the sides of the electrically conductive layers 602A/602B. This may prevent fingers or other capacitance-disturbing environmental elements from crossing the threshold and registering as a broken packet. This non-conductive shielding may be applied in a single layer or in multiple layers and may be applied over the entire surface of the packet, or over specified portions thereof.

In some cases, if the capacitance or other electrical property sensed by the capacitive sensors has changed beyond a threshold amount, the transceiver may be used to transmit a signal indicating the packet has been opened. If the change in capacitance is very minor and is below a specified threshold, no reporting may take place, or other reporting may indicate that the packet may have been slightly damaged but not opened. Tracking packets may be short (e.g. 1-3 inches) or may be very long (e.g. 6-10 inches or longer). When the tracking packet is torn, the location of the tear may affect the capacitance reading.

When the packet is torn, the transceiver (e.g., transceiver 105 of FIG. 1) may communicate with GPS, WiFi, Bluetooth, cellular, long range (LoRa) low power wireless networks, or other wireless networks to determine the current location of the tracking packet and/or determine the current time. Thus, the tracking packet 700 may determine its exact location and time when the change in capacitance occurred. This change in capacitance, along with location and time data may be reported or communicated to various entities. Additionally or alternatively, the tracking packet may include a data store (e.g., 111 of FIG. 1) (e.g., flash memory or an EEPROM), and the processor may be configured to record any changes in capacitance in the data store as the measurements are made.

In some embodiments, the enclosure 101 of FIG. 1 may further include an accelerometer. The accelerometer may be configured to sense movement. As such, the accelerometer may detect when the tracking packet is moving. At such points, the accelerometer may wake one or more other components in the enclosure 101 to begin taking measurements. Additionally or alternatively, the accelerometer may detect if the tracking packet is being jerked around as would happen if a user is tearing open or cutting the packet. Such movements may also act as a trigger to wake the microcontroller and/or sensors to begin determining whether the tape/sticker has been torn. In cases where the package or item is sitting still, the accelerometer may indicate no movement and may preserve battery by not waking the detecting components.

While in some embodiments, the tracking packet may include a single dielectric layer surrounded by two conductive layers, in other cases, the tracking packet may include two dielectric layers surrounded by three conductive layers, forming a sandwich that alternates between conductive layers and dielectric layers. Many different layers and layer structures may be used in the system. Moreover, the dielectric layer need not be a single straight line. The dielectric layer may be patterned (e.g., in a snaking s-shaped pattern, in a square pattern, in a zig-zag pattern, in a circular or spiral pattern or in some other shape). The capacitance layer may be of the same or similar thickness throughout or may vary in thickness in different locations. In cases where a dielectric layer is surrounded by two conductive layers, the conductive layers may overlap in such a manner that the overlap only occurs along the portions of dielectric, in whichever pattern the dielectric material is distributed.

As further shown in FIG. 1, the system 100 may further include a display 102 to present information related to the incremental changes in capacitance. The display may be configured to display patient data, prescription information or other data. The display may note which packets, for example, have been removed from a roll of packets, or whether a packet has simply been opened even though it is still connected to the roll of packets. Any tear or change in the electrically conductive layer 107 may change the measured capacitance. Any changes beyond a specified threshold value may be reported using the transceiver, and/or may be displayed on the display 102. In some cases, the transceiver 105 may be configured to transmit information related to the incremental changes in capacitance each time a change beyond the specified threshold occurs. Such functionality may be used to notify doctors, nurses or caregivers that a patient is accessing their medication.

The processor 104 may be configured to analyze signals from the electrically conductive layer 107 to determine the distribution status of the packets 110. Accordingly, the processor may take measurement data from the capacitance sensors 106 and determine whether any changes to the electrically conductive layer 107 have occurred. For instance, if the packets 110 are coated with electrically conductive ink, and a user detaches one of the packets, the detaching process will tear at least some of the conductive ink. This tear in the conductive ink will change the level of measured capacitance in the electrically conductive layer 107. This measurable difference in capacitance may indicate a degree to which the capacitive electrically conductive layer has been torn. In this manner, the system 100 may determine which packet was opened, even in a roll of multiple connected packets. Using the transceiver to communicate with outside networks, the system may also determine the time and geographic location indicating when and where the system was when the packet was opened.

The microcontroller 104, a transceiver 105 and/or the optional battery 106 may be part of a single chip or other hardware structure or enclosure (e.g., 101) that can be added to the roll of packets or embedded in the roll of packets. For instance, the hardware enclosure 101 may be detachable from the apparatus 100 and may be attached at a later time. For instance, the roll of packets may include conductive traces 107 and may include junctions or nodes where the hardware enclosure 101 may be attached. In some cases, the hardware structure may be attached to a roll of packets after it has been shrink-wrapped for transit. The hardware enclosure 101 may be attached so that at least some of its electrical components (e.g., the microprocessor 104 and the battery 106) are electrically connected to the traces 107. The hardware enclosure 101 may be detached at a later point in time (e.g., after delivery). The hardware enclosure 101 may then be recycled or reused in another tracking application (e.g., on another roll of tracking packets).

Figure 8:
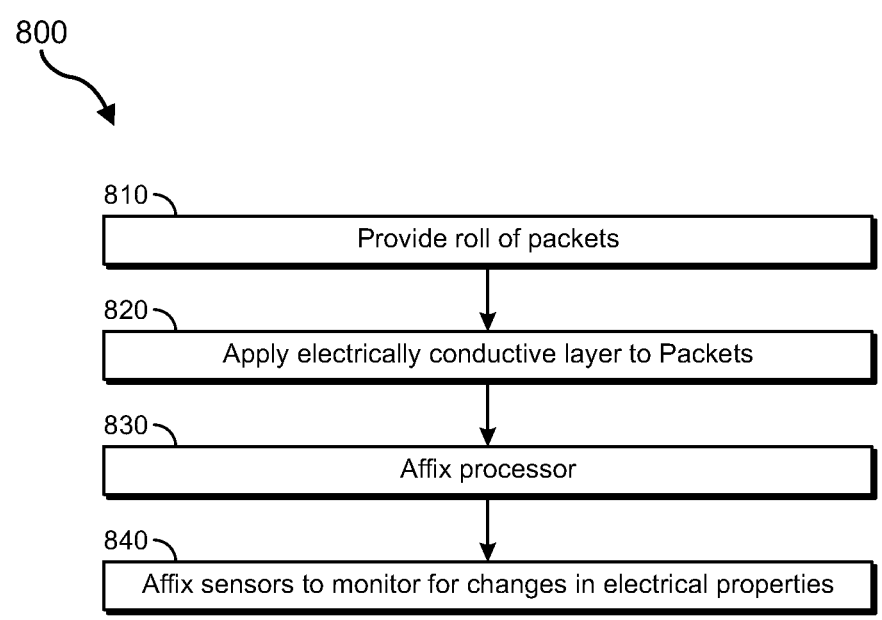
FIG. 8 illustrates a flowchart of an example method for manufacturing an apparatus for tracking usage of an item.

In view of the systems and architectures described above, methodologies that may be implemented in accordance with the disclosed subject matter will be better appreciated with reference to the flow chart of FIG. 8. For purposes of simplicity of explanation, the methodologies are shown and described as a series of blocks. However, it should be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described hereinafter.

FIG. 8 illustrates a flowchart of a method 800 of manufacturing an apparatus for tracking usage of an item. The method 800 will now be described with frequent reference to the components and data of apparatus 100 of FIG. 1.

Method 800 describes a method of manufacturing an apparatus configured to track usage of an item. First, the method 800 may include providing a roll of one or more packets configured to hold various packetized items (810). Next, the method may include applying an electrically conductive layer to at least a portion of the packet (or in some cases, to an entire roll of packets) (820). The electrically conductive layer may include electrically conductive material that is capable of storing an electric charge.

The method 800 may further include affixing a processor to the apparatus (830), and further affixing one or more sensors to at least one of the packets in the roll of packets (840). The sensors (e.g., capacitance or resistance sensors) may be electrically connected to the electrically conductive material in the electrically conductive layer to be able to sense the stored energy. The processor may also be configured to monitor the electrically conductive layer for incremental changes in capacitance using capacitance measurements received from the capacitance sensors.

In some cases, the method 800 may further include providing a power supply to power the processor and capacitance sensors. Such a power supply may be a battery or a wireless power supply such as an inductive power supply that reacts to an electric field provided by another device. When initially manufactured, the apparatus may include an insulating tab between the processor and the power supply to prevent the processor from draining the power supply before use in the field. Once ready for use (e.g. in a hospital), the insulating tab may be removed to allow the power supply to provide power to the processor. Each of the packets may be linked together via a separable connection. Once the battery is operable to provide power to the microprocessor, the microprocessor may analyze signals from the electrically conductive layer to determine how many packets have been removed from the roll of packets.

Accordingly, systems and apparatuses are provided which track the usage of packetized items. The concepts and features described herein may be embodied in other specific forms without departing from their spirit or descriptive characteristics. The described embodiments are to be considered in all respects only as illustrative and not restrictive. The scope of the disclosure is, therefore, indicated by the appended claims rather than by the foregoing description. All changes which come within the meaning and range of equivalency of the claims are to be embraced within their scope.

We claim:

1. An apparatus for tracking usage of a packetized item, comprising:
    a roll of two or more packets including at least a first packet and an end packet that are configured to contain packetized items, each packet in the roll including two or more portions of electrically conductive material that cover at least some portion of the packet,
        wherein the two or more portions of electrically conductive material of the first packet are separated by a physical, removable barrier that prevents signals from traveling between the two or more portions of electrically conductive material, and
        wherein the end packet includes a tear-off that reaches up from the end packet and is attached to the physical barrier of the first packet, such that removing the end packet from the roll of packets removes the physical barrier from the first packet, allowing signals to travel between the two or more portions of electrically conductive material;
    an enclosure configured to track removal of the one or more packets, the enclosure comprising:
        a power source;
        a display;
        a transceiver; and
        a microcontroller configured to control operation of the display and to further analyze signals from the electrically conductive material to determine whether at least one of the packets has been removed from the roll.

2. The apparatus of claim 1, wherein the packetized items contained within the packets comprise one or more controlled substances.

3. The apparatus of claim 1, wherein the electrically conductive material comprises electrically conductive ink that is printed on the one or more packets.

4. The apparatus of claim 3, wherein the electrically conductive ink is printed in the form of one or more traces, and wherein the traces are electrically connected to one or more electrical components distributed on the packets.

5. The apparatus of claim 1, wherein the enclosure includes one or more electrical contacts configured to contact at least a portion of the electrically conductive material.

6. The apparatus of claim 5, wherein the signals analyzed by the microcontroller comprise measurements of resistance or capacitance detected at the electrical contacts.

7. The apparatus of claim 6, wherein the one or more packets comprise a group of packets connected together in a separable manner, and wherein the measurements of resistance or capacitance change as each packet is separated from the group of packets.

8. A system for tracking usage of an item, comprising:
    a roll of two or more packets including at least a first packet and an end packet, each packet being configured to contain one or more packetized items;
    an electrically conductive layer that is applied to at least a portion of the packet, the electrically conductive layer including two or more portions of electrically conductive material,
        wherein the two or more portions of electrically conductive material of the first packet are separated by a physical, removable barrier that prevents signals from traveling between the two or more portions of electrically conductive material, and
        wherein the end packet includes a tear-off that reaches up from the end packet and is attached to the physical barrier of the first packet, such that removing the end packet from the roll of packets removes the physical barrier from the first packet, allowing signals to travel between the two or more portions of electrically conductive material;
    a processor; and
    one or more sensors that are electrically connected to the electrically conductive material in the electrically conductive layer,
    wherein the processor is configured to monitor the electrically conductive layer for incremental changes in one or more electrical properties using the one or more sensors.

9. The system of claim 8, wherein the sensors comprise capacitance sensors.

10. The system of claim 8, further comprising a display to present one or more portions of information related to the incremental changes in the one or more electrical properties.

11. The system of claim 8, further comprising a transceiver configured to transmit one or more portions of information related to the incremental changes in the one or more electrical properties.

12. The system of claim 11, wherein the packets are detachable from each other.

13. The system of claim 12, wherein the processor is configured to analyze signals from the electrically conductive layer to determine how many packets have been removed from the one or more packets.

14. The system of claim 8, further comprising a data store configured to store one or more portions of information related to the incremental changes in the one or more electrical properties.

15. The system of claim 8, wherein the incremental changes in the one or more electrical properties comprise changes in capacitance.

16. The system of claim 15, wherein the amount of change in capacitance indicates a degree to which the capacitive electrically conductive layer has been torn.

17. A method of manufacturing an apparatus for tracking usage of an item, the method comprising:
    providing a roll of two or more packets including at least a first packet and an end packet, each configured to hold one or more items;
    applying an electrically conductive layer to at least a portion of the packet, the electrically conductive layer including at least two portions of electrically conductive material,
        wherein the two or more portions of electrically conductive material of the first packet are separated by a physical, removable barrier that prevents signals from travelling between the at least two portions of electrically conductive material, and
        wherein the end packet includes a tear-off that reaches up from the end packet and is attached to the physical barrier of the first packet, such that removing the end packet from the roll of packets removes the physical barrier from the first packet, allowing signals to travel between the at least two portions of electrically conductive material;
    affixing a processor to the apparatus; and
    affixing one or more sensors to the packets, wherein the sensors are electrically connected to the electrically conductive material in the electrically conductive layer, and wherein the processor is configured to monitor the electrically conductive layer for incremental changes in one or more electrical properties using measurements received from the sensors.

18. The method of claim 17, further comprising providing a power supply to power the processor and sensors.

19. The method of claim 18, further comprising providing an insulating tab between the processor and the power supply.

20. The method of claim 19, wherein the insulating tab is removed to allow the power supply to provide power to the processor.

* * * * *